United States Patent [19]

Peterson

[11] Patent Number: 4,793,846
[45] Date of Patent: Dec. 27, 1988

[54] GOB DISTRIBUTOR

[75] Inventor: George T. Peterson, Bristol, Conn.

[73] Assignee: Emhart Industries, Inc., Farmington, Conn.

[21] Appl. No.: 20,272

[22] Filed: Mar. 2, 1987

[51] Int. Cl.$^4$ ............................................. C03B 7/16
[52] U.S. Cl. ..................................... 65/164; 65/158; 65/159; 65/165; 65/DIG. 13
[58] Field of Search ................. 65/122, 127, 158, 159, 65/164, 165, DIG. 13

[56] References Cited

U.S. PATENT DOCUMENTS

| | | | |
|---|---|---|---|
| 4,108,623 | 8/1978 | Cardenas-Franco | 65/163 |
| 4,357,157 | 11/1982 | Cardenas-Franco et al. | 65/164 |
| 4,431,436 | 2/1984 | Lulejian | 65/159 |
| 4,453,963 | 6/1984 | Larson et al. | 65/159 |
| 4,459,146 | 7/1984 | Farkas et al. | 65/159 |
| 4,469,501 | 9/1984 | Kingsbury et al. | 65/158 |
| 4,504,301 | 3/1985 | Bystrianyk et al. | 65/159 |
| 4,547,211 | 10/1985 | Ananias | 65/159 |
| 4,614,531 | 9/1986 | Bishop et al. | 65/159 |

Primary Examiner—Arthur Kellogg
Attorney, Agent, or Firm—Spencer T. Smith

[57] ABSTRACT

Gobs of molten glass are sheared and fall by gravity to a gob distributor which redirects the gobs to individual glassware forming sections. The location of the gob as it drops is monitored and at the time when the interceptor must be actuated if a gob is to be deflected into a cullet chute, the gob request is verified and section status is determined. If the specific section has not been enabled or if an out of sequence request has been received, the gob interceptor is actuated at this time.

4 Claims, 4 Drawing Sheets

FIG. 2B

Figure 2A:
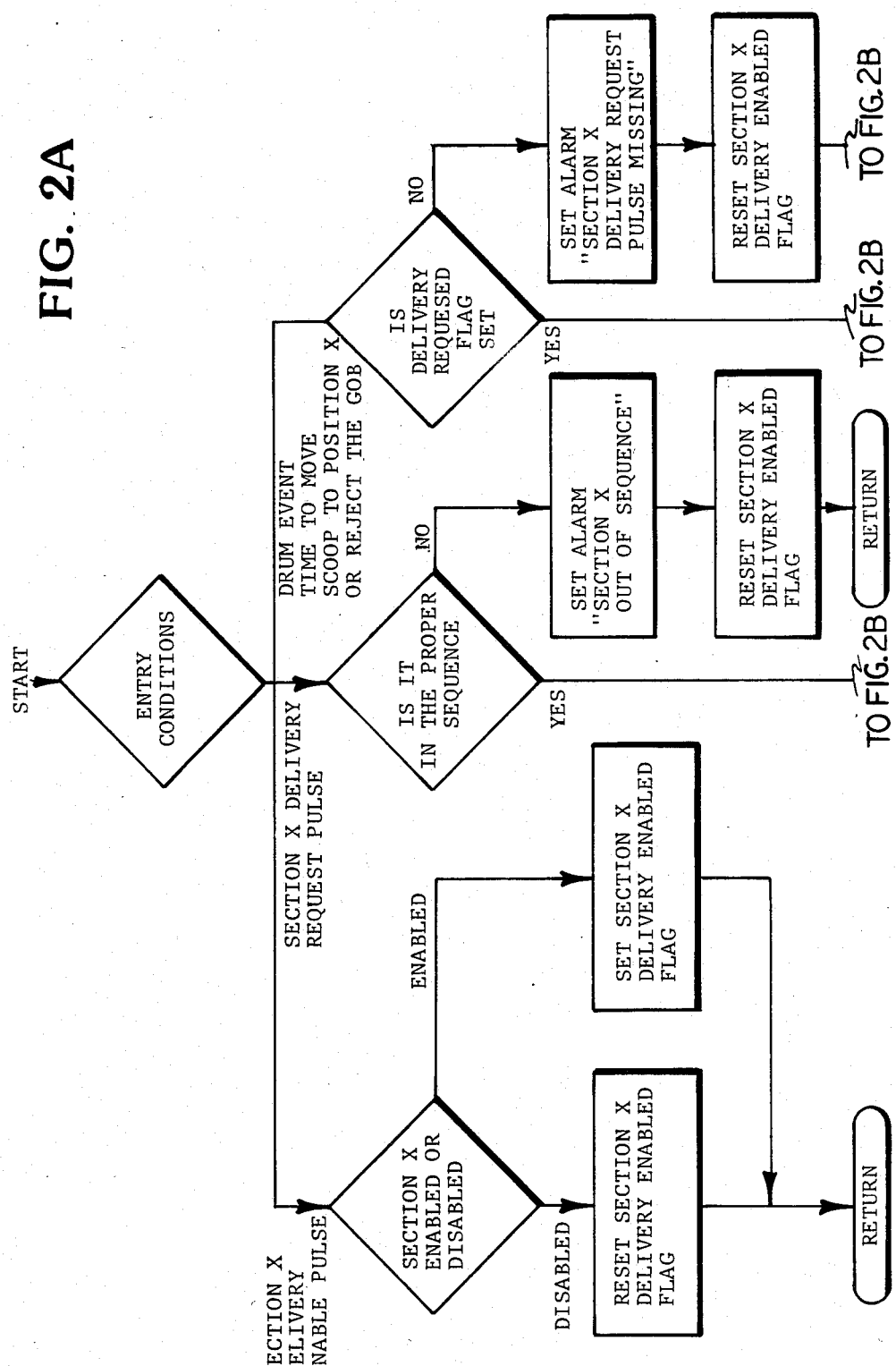

```
TO FIG.2A
    │
    ▼
  ┌─────────────┐
  │ IS          │ NO    ┌──────────────┐
  │ SECTION X   │──────▶│ ACTIVATE     │
  │ DELIVERY    │       │ INTERCEPTION │
  │ ENABLED     │       └──────┬───────┘
  │ FLAG SET    │              │
  └─────────────┘              │
    │ YES                      │
    ▼                          │
  ┌─────────────┐              │
  │ DELIVER GOB │◀─────────────┘
  │ TO          │
  │ SECTION X   │
  └──────┬──────┘
         ▼
      ( RETURN )
```

TO FIG.2A
↓
┌──────────────┐ YES   ┌──────────────────┐
│ IS SECTION X │──────▶│ SET ALARM        │
│ ... (from    │       │ "SECTION X       │
│ FIG.2A)      │       │ DELIVERY REQUEST │
└──────────────┘       │ LINE BOUNCED"    │
                       └────────┬─────────┘
                                ▼
                       ┌──────────────────┐
                       │ RESET SECTION X  │
                       │ DELIVERY ENABLED │
                       │ FLAG             │
                       └────────┬─────────┘
                                ▼
                            ( RETURN )

TO FIG.2A
↓
┌──────────────┐
│ WERE THERE   │ YES  → (to SET ALARM above)
│ TWO REQUESTS │
│ IN SAME      │
│ WINDOW       │
└──────┬───────┘
       │ NO
       ▼
┌──────────────┐
│ SET DELIVERY │
│ REQUESTED    │
│ FLAG         │
└──────────────┘

GOB DISTRIBUTOR

The present invention relates to glassware forming machines and more specifically to a system for controlling the delivery of gobs of molten glass to a gob distributor which distributes the gobs to individual glassware forming sections.

Whenever gobs should not enter the gob distributor, a deflector is advanced into the path of the gob to redirect the gob to a cullet chute. A prior system for controlling the deflector is disclosed in U.S. Pat. No. 4,453,963.

It is an object of the present invention to provide an improved system for controlling the operation of the deflector.

Other objects and advantages of the present invention will become apparent from the following portion of this specification and from the following drawings which illustrate, in accordance with the mandate of the patent statutes, a presently preferred embodiment of the invention.

Figure 1:
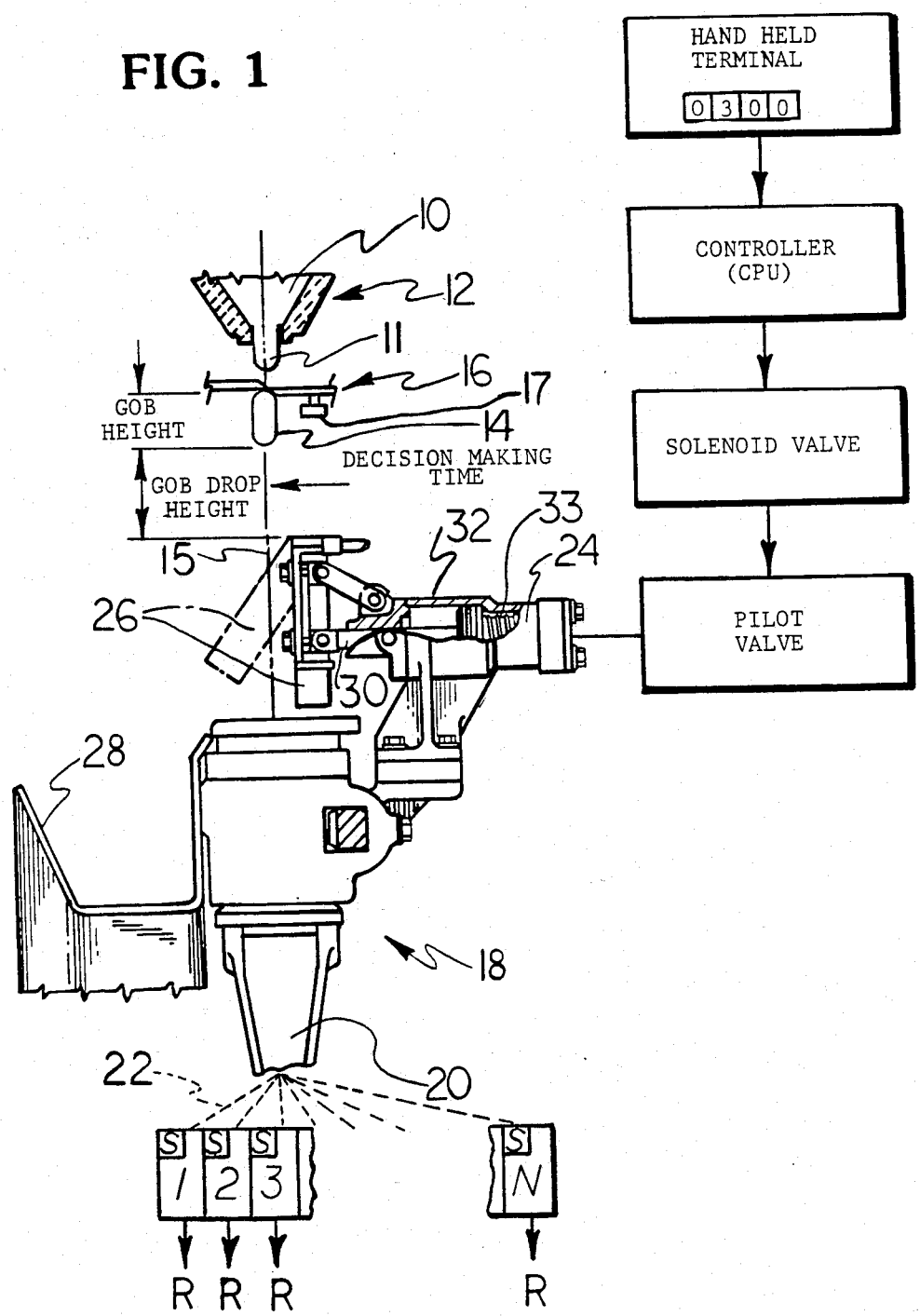
Figure 3:
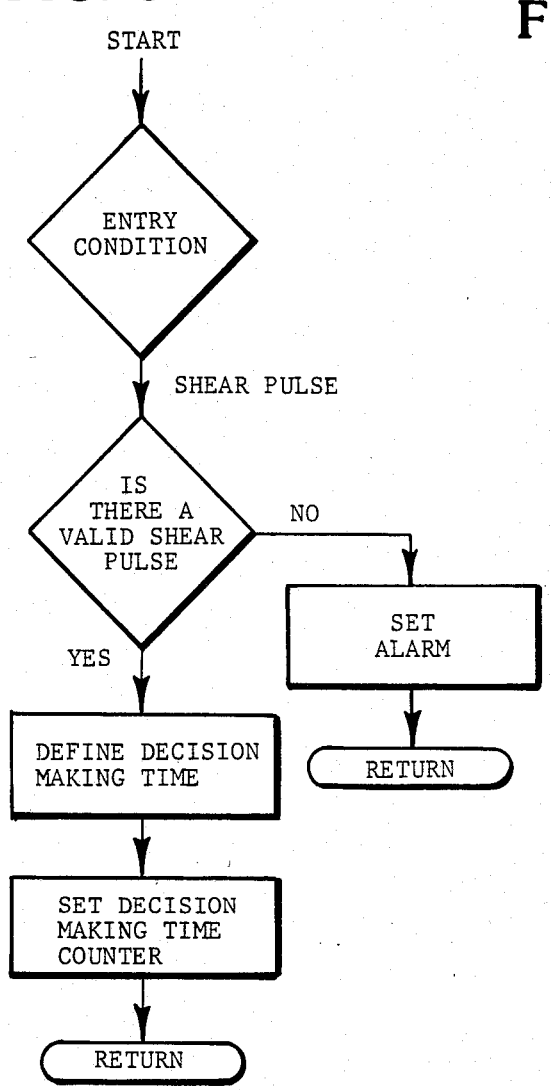
Figure 4:
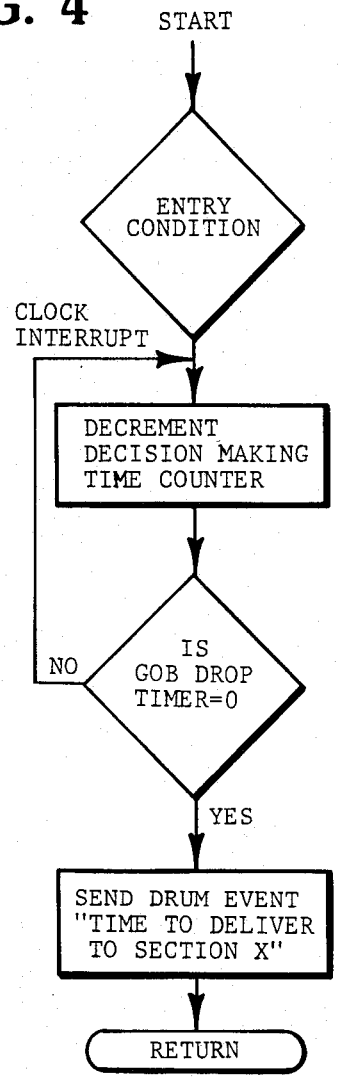

Referring to the drawings:

FIG. 1 is a schematic illustration of a glassware forming machine;

FIGS. 2a and 2b combined is a flowchart illustrating the delivery/supervision algorithm for this machine;

FIG. 3 is a flowchart illustrating the shear/feeder pulse algorithm for the machine; and FIG. 4 is a flowchart illustrating the gob drop timer algorithm for the machine.

In glassware forming machines, molten glass 10 is extruded as a continuous runner 11 from a feeder 12 and is cut into discrete gobs 14 by shears 16 which are advanced to define a gob having a predetermined length (the actual time when the gob is cut from the runner is determined by a proximity probe 17 on the shear cam). The gob 14 drops and follows its gravitational path 15 into the open end of the gob distributor 18. The gob continues its fall and is redirected by the gob scoop 20 to a receiving trough 22 which leads to a selected glassware forming section (1, 2, 3 . . . N). Gobs are sequentially directed to these sections in response to gob requests R issued by these sections in accordance with a predetermined feed program. Each section is enabled by the manual operation of a switch S at each section to indicate that gobs can be delivered to that section.

An interceptor 24 is provided to prevent a gob 14 from entering the gob distributor 18. The interceptor 24 includes a deflector or guide 26 which can be advanced from a remote deliver position where gobs 14 can be delivered to the gob distributor 18 to an advanced reject position (shown in phantom) where gobs will be deflected into a cullet chute 28. The deflector is operated by the rod 30 of an interceptor valve 32 which is conrrolled by an air operated for way Pilot Valve. The normal power on position of the deflector is the deliver position and the normal power off position, due to spring 33, is the deflect position. During machine operation, the deflector 26 will advance towards the reject position whenever the Controller (central processing unit or CPU) signals the operation of the Solenoid Valve.

The machine operator who programs the gob distributor cycle also inputs into the computer processing unit the Gob Drop Time which is the time it takes a sheared gob to drop to the top of the deflector 26. This distance is equal to the vertical separation between the shears and the top of the deflector less the height of the gob. (If the CPU has the ability to convert gob drop height to gob drop time, gob drop height can be inputted and the CPU will determine the gob drop time). The illustrated digital input to the hand held terminal represents the inputted drop time. In the illustrated embodiment, it takes 300 milliseconds for a sheared gob to drop to the top of the deflector 26 (gob drop time). It takes about 120 milliseconds (event time) either to displace the scoop 20 to its next location or to advance the deflector 26 to its intercept location. A Decision Making Time is defined which is the Gob Drop Time less the Event Time (the time when the interceptor must be actuated to advance the deflector or the gob will drop past it undeflected).

FIG. 2 shows the flowchart for the delivery/supervision algorithm. When the CPU establishes the entry condition to the left hand path of this algorithm (section X delivery enable pulse), section X switch S will be polled and if it has been operated by the operator, the section X delivery enabled flag will be set. If not, the section X delivery enable flag will be reset.

Gobs will be directed to these sections in accordance with requests from these sections which should issue in conformance with the desired feed program. When the CPU establishes the entry condition for the central path of the delivery/supervision algorithm (section X delivery request pulse), this path determines whether the request R actually received is in the proper sequence. If the section requests a gob in the proper sequence and if only one request is received in the same window, then the section X delivery requested flag will be set. If the request is out of sequence or if more than one request in the same window is received, then an alarm is set and the section X delivery requested flag is reset.

The third path of the delivery/supervision algorithm will be entered when the CPU establishes the correct entry condition (Drum Event Time to Move Scoop to Position X or Reject Gob). If the section X delivery requested flag and the section X delivery enabled flag have been set, a gob will be delivered to Section X (the scoop will be repositioned to that section). If, on the other hand, either of these flags has not been set, the interceptor 24 will be actuated to prevent the gob 14 from reaching the gob distributor 18. If the section X delivery requested flag has not been set, an appropriate alarm will issue and the section X delivery enabled flag will be reset. The section X delivery enabled flag will accordingly be reset whenever a section X gob request is out of sequence, whenever section X issues two requests during the same window or whenever no pulse is received. Section X is disabled even though Section X has been enabled by the operator and only section X is disabled (so that the rest of the machine may continue to operate).

The flowchart for the shear/feeder pulse algorithm is illustrated in FIG. 3. With each shear, a pulse is generated. This pulse is validated and the Decision Making Time (count) is defined by subtracting the Event Time for the Gob Drop Time. The Decision Making Time Counter (FIG. 4) will be set to the Decision Making Time count. When the Decision Making Time Counter (timer) counts out (decrements to zero), the gob has dropped to the point where a decision will be made (the entry conditinn for the third path of the delivery/supervision algorithm will have been established) requiring either the operation of the interceptor 24 or the delivery of the gob to section X. When the gob drops to the top of the deflector, the deflector will be in the reject position if the gob is to be deflected to the cullet chute or the deflector will be at the deliver position, and the gob scoop will be located to deliver the gob to section X.

I claim:

1. A glassware forming machine comprising
   means for feeding a runner of molten glass,
   means for shearing a gob of glass from said runner, the gob falling by gravity along a drop path,
   a plurality of glassware forming sections,
   a gob distributor including at least one gob scoop for receiving a gob as it falls along the drop path,
   means for positioning said gob scoop at a plurality of positions in accordance with a predetermined feed program to sequentially deliver received gobs to said plurality of sections,
   gob deflector means,
   means for advancing said deflector means from a retracted deliver position to an advanced reject position for deflecting a gob falling along the drop path toward said gob distributor away from said gob distributor,
   means for timing the drop of said gob from said shear location along the drop path,
   means for setting said timing means to have a duration selected to locate the gob along the drop path a predetermined height above said deflector means,
   means for determining, when said timer times out, whether a section in accordance with the feed program has requested a gob and whether that section has been enabled, and
   means for operating said advancing means in the event said determining means does not so determine, said predetermined height of the gob above said deflector means being selected to permit the advancement of said deflector means to said reject position before the gob reaches said deflector means.

2. A glassware forming machine according to claim 1, wherein said predetermined height is the minimum height required to permit the displacement of said deflector means from said deliver position to said reject position.

3. A glassware forming machine according to claim 2, further comprising means for disabling one of said plurality of sections in the event said one section requests a gob out of sequence.

4. A glassware forming machine according to claim 3, wherein said disabling means further comprises means for disabling one of said sections in the event said determining means does not determine that the section has requested a gob.

* * * * *